United States Patent
Clairadin et al.

(10) Patent No.: US 6,209,162 B1
(45) Date of Patent: Apr. 3, 2001

(54) SYSTEM FOR CLEANING FIBER OPTIC CONNECTORS

(75) Inventors: Xavier Clairadin, Naperville; Igor Grois, Northbrook; Thomas R. Marrapode, Bolingbrook; Richard F. Roth, Downers Grove; Maurice X. Sun, Westmont, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/277,435

(22) Filed: Mar. 26, 1999

(51) Int. Cl.[7] ............................. A47L 25/00; B08B 1/00
(52) U.S. Cl. ..................... 15/97.1; 15/210.1; 385/147
(58) Field of Search .................. 15/97.1, 210.1, 15/104.94; 385/134, 135, 147

(56) References Cited

U.S. PATENT DOCUMENTS

| | | | |
|---|---|---|---|
| 2,851,008 | * | 9/1958 | Rochester ........................ 15/210.1 |
| 4,428,092 | * | 1/1984 | Lipari ............................. 15/210.1 X |
| 5,117,528 | | 6/1992 | Kanayama et al. .............. 15/210.1 |
| 5,220,703 | | 6/1993 | Kanayama et al. .............. 15/210.1 |
| 5,768,738 | * | 6/1998 | Lee ................................. 15/210.1 |
| 5,863,211 | | 1/1999 | Sobotta et al. ..................... 439/74 |
| 5,878,458 | * | 3/1999 | Higginbotham ................ 15/104.94 |

OTHER PUBLICATIONS

NTT International Product Specification for Optical Fiber Connector Cleaner. Date received Apr., 1995.

* cited by examiner

*Primary Examiner*—Mark Spisich
(74) *Attorney, Agent, or Firm*—A. A. Tirva

(57) ABSTRACT

A system is provided for cleaning the end of a ferrule of a fiber optic connector mounted on a backplane of a chassis adapted for receiving a printed circuit board having a mating connector mateable with the fiber optic connector. A dummy circuit board is receivable by the chassis to replace the actual printed circuit board. A cleaner is mounted on the dummy circuit board for cleaning the end of the ferrule of the fiber optic connector when the dummy circuit board is received by the chassis.

23 Claims, 12 Drawing Sheets

SYSTEM FOR CLEANING FIBER OPTIC CONNECTORS

FIELD OF THE INVENTION

This invention generally relates to the art of fiber optic connectors and, particularly, to a system for cleaning the end of a ferrule of a fiber optic connector mounted on a backplane of a chassis adapted for receiving a printed circuit board.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and positions an optical fiber or fibers within the connector. The ferrule may be fabricated of such material as ceramic or glass filled resin. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

Such fiber optic connectors typically are connected end-to-end. In other words, two opposite end surfaces of opposing ferrules are mated to directly connect opposing end surfaces of the optical fibers to each other. The connectors should provide excellent connection characteristics. However, major problems are encountered if the ferrule end surfaces become contaminated by dust, oil or other contaminants which will cause the connection characteristics to become markedly deteriorated.

In order to solve the contamination problems, cleaners have been provided to clean the ferrule end surfaces of fiber optic connectors. The cleaners typically include some form of soft cloth or paper which is moved over the ferrule end surfaces. The cloth or paper may be dampened with a cleaning solution such as ethanol. Fluorocarbon gas may also be used to remove excessive ethanol and any cloth or paper dust.

While cleaners of the character described above have proven effective for their intended purposes, they have limitations in that the fiber optic connectors typically are "brought to" the cleaner or there is easy access of the cleaner to the connectors. In other words, the connectors are easily moved to positions in engagement with the cleaner. Such cleaners are extremely difficult to use and, often, are not effective where there is limited access to the connectors, such as where the connectors are located in a remote or confined area. Still further, it is difficult, if not impossible, to use most existing cleaners on the ferrule end surfaces of connectors which are mounted in adapter assemblies. The connectors must be removed from the adapters in order to be cleaned. This problem equally exists when a ferrule end surface is located inwardly or recessed within a mating end face of a connector. The present invention is directed to solving this myriad of interrelated problems.

SUMMARY OF THE INVENTION

An object, therefore, of the invention, is to provide a new and improved system for cleaning fiber optic connectors, such as cleaning the end of a ferrule of a fiber optic connector.

Another object of the invention is to provide such a cleaning system wherein the fiber optic connector is mounted on a backplane of a chassis adapted for receiving a printed circuit board having a mating connector mateable with the fiber optic connector.

In the exemplary embodiment of the invention, the system includes a dummy circuit board receivable by the chassis. A cleaner is mounted on the dummy circuit board for cleaning the end of the ferrule of the fiber optic connector when the dummy circuit board is received by the chassis. Therefore, the actual printed circuit board can be removed from the chassis and the dummy circuit board, along with the cleaner, inserted into the chassis for cleaning purposes, whereafter the actual printed circuit board can be repositioned.

As disclosed herein, the dummy circuit board includes a cut-out portion within which at least a portion of the cleaner is mounted. Complementary interengaging mounting means are provided between the cleaner and the dummy circuit board for mounting the cleaner on the board at different positions to accommodate the fiber optic connector being mounted at different locations on the backplane. The mounting means include a plurality of mounting holes in the dummy circuit board for receiving fastening means from the cleaner.

The cleaner includes a mating portion for mating the cleaner with the fiber optic connector on the backplane. As disclosed herein, the mating portion is formed by a mating nose for insertion into a mating receptacle of the fiber optic connector. The nose includes an opening in a distal end thereof at which a cleaning medium of the cleaner is exposed.

Specifically, the cleaner includes a cleaning tape and an advancing mechanism for advancing the cleaning tape past the ferrule end of the fiber optic connector when the dummy circuit board is received by the chassis. A supply reel is provided for supplying the cleaning tape, and a take-up reel is provided for taking-up the cleaning tape from the supply reel. A ratcheting mechanism rotates one of the reels for incrementally advancing the cleaning tape. A pawl prevents rotation of at least the one reel. Gear means interconnect the supply reel and the take-up reel for conjoint rotation.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Referring to the drawings in greater detail, and first to FIGS. 1–4, a cleaner, generally designated 14, is provided for cleaning the end of a ferrule of a fiber optic connector as will described hereinafter in relation to FIG. 6. The cleaner includes a housing 16 and a cover 18 defining an interior cavity 20 therebetween. The cover has five holes 22 (FIG. 1) for receiving appropriate screws or other fasteners insertable into five internally threaded holes 24 (FIG. 2) to hold the cover on the housing and to gain access to interior cavity 20. The housing has four additional internally threaded mounting holes 26, for purposes described hereinafter. Cover 18 has two holes 27 aligned with two of the holes 26 in housing 16. Housing 16 and cover 18 may be fabricated of molded plastic, die-cast metal or other appropriate material.

Figure 1:
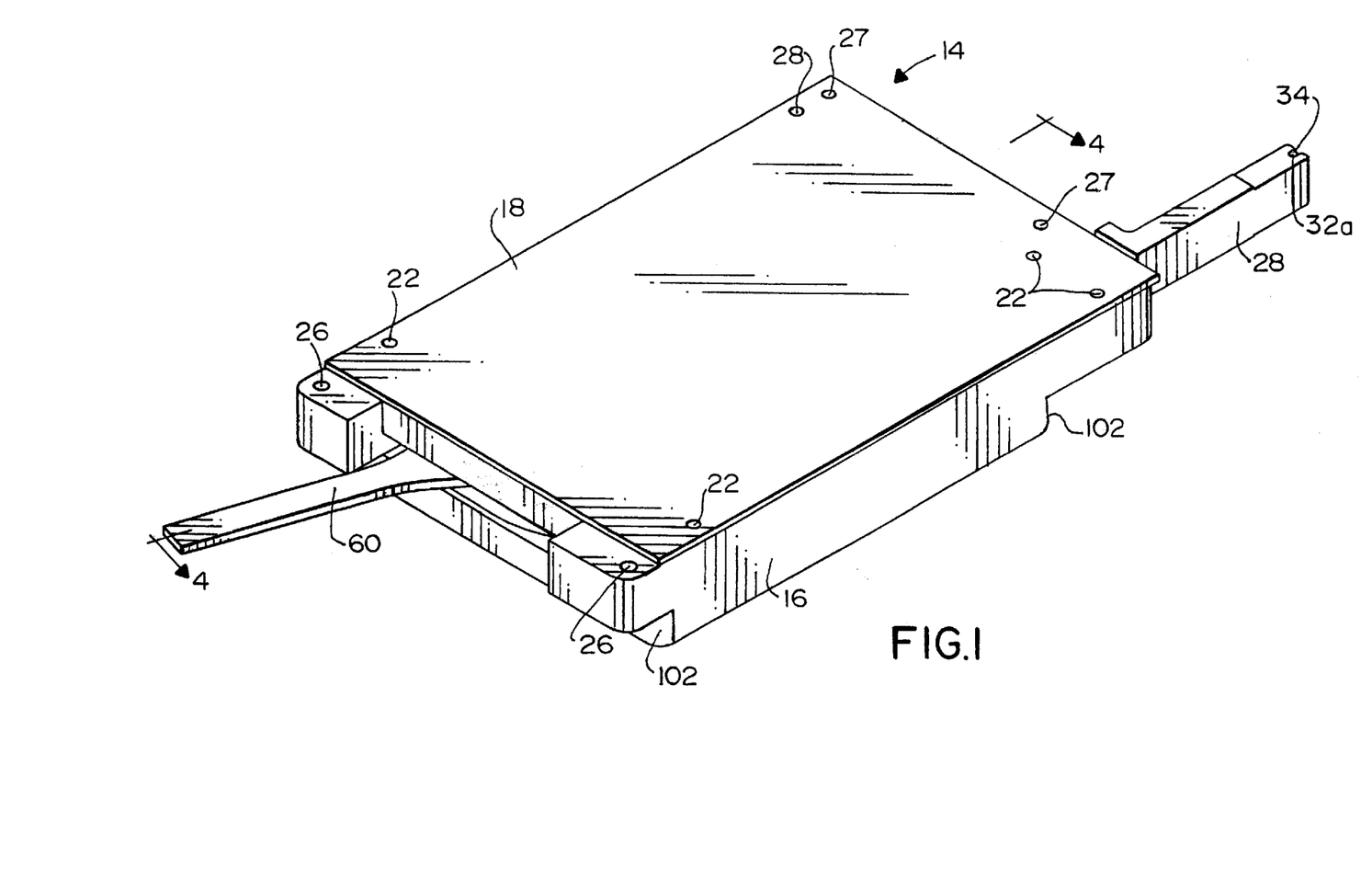
FIG. 1 is a perspective view of a cleaner for a fiber optic connector, according to the invention.
Figure 2:
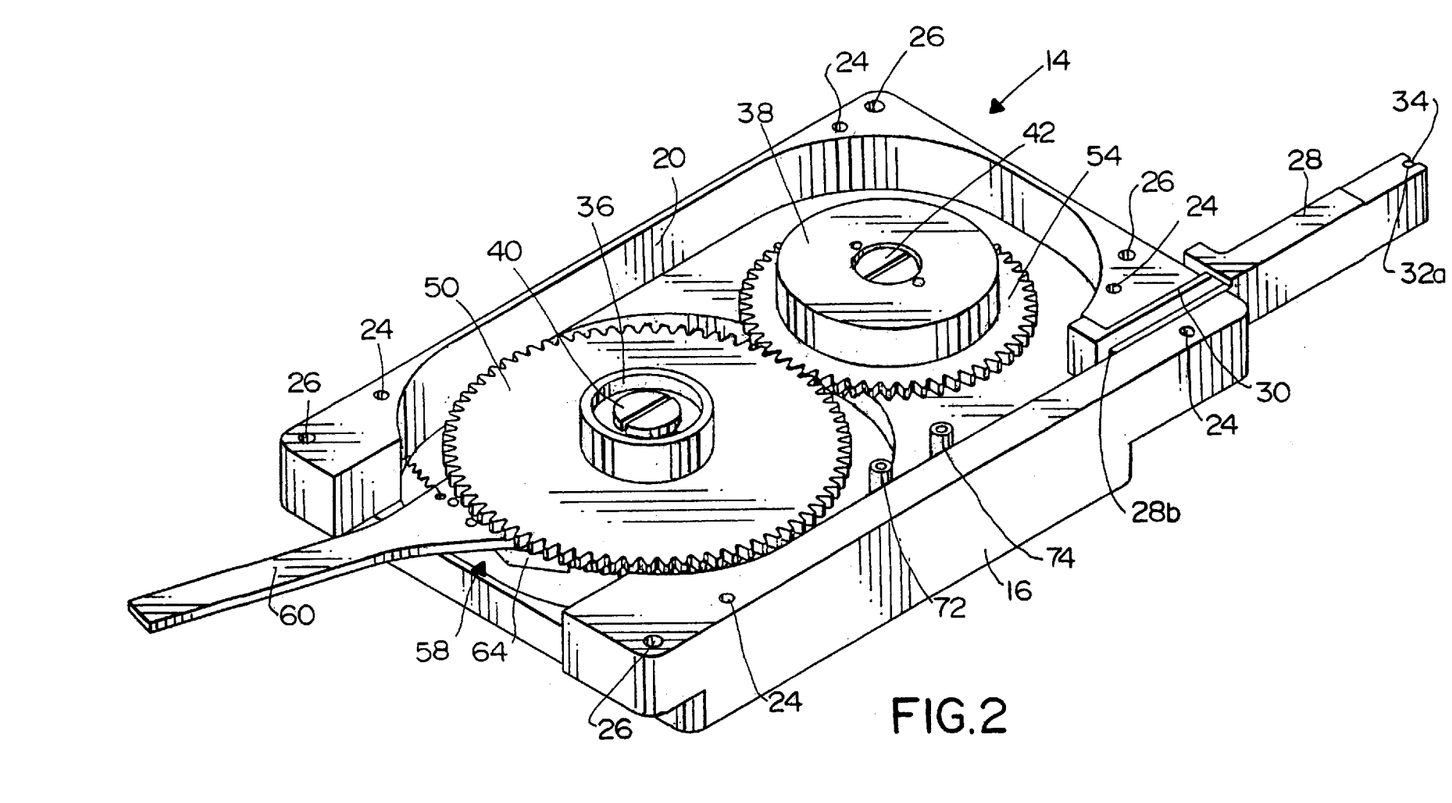
FIG. 2 is a perspective view similar to that of FIG. 1, with the cover of the cleaner removed and without a cleaning tape in the cleaner.
Figure 3:
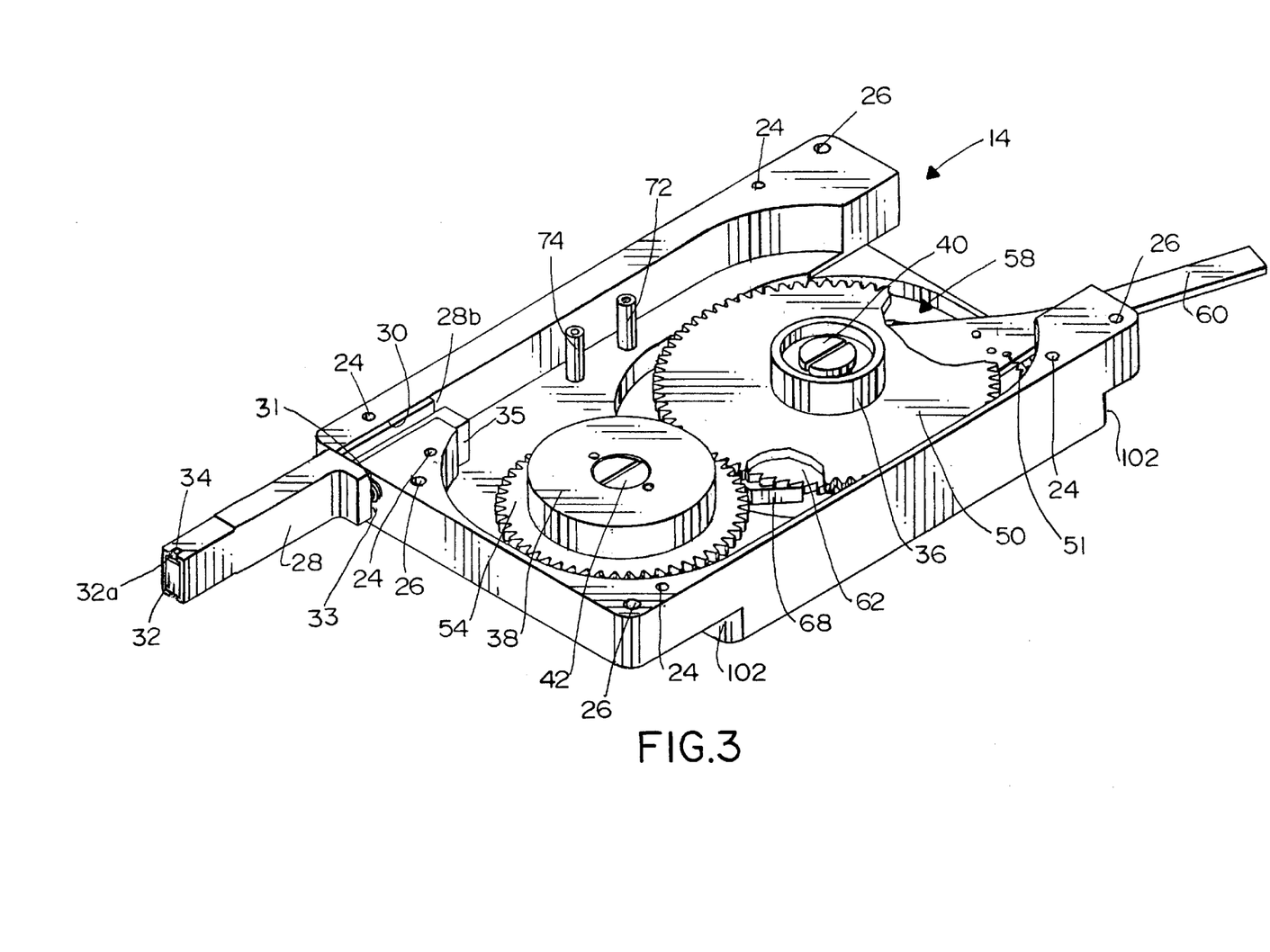
FIG. 3 is a perspective view looking at the opposite end of the cleaner from that shown in FIG. 2.

A unique feature of cleaner 14 is the provision of a mating portion for mating the cleaner with a fiber optic connector, as will be seen hereinafter. The mating portion herein is formed by an elongated mating nose 28 which has a through passage 28a (FIGS. 5 and 6) and which communicates with interior cavity 20, as at 28b (FIGS. 2 and 3). Mating nose 28 can be formed integrally with housing 16, or the mating nose can be a separate member (as shown) having a rear end slidably mounted within a channel 30 of housing 16. The nose is spring loaded by spring 31 located between a portion 33 of the nose and the housing 16. The nose 28 includes a projection 35 which extends from the rear end of the nose located in channel 30. The projection 35 engages a portion of housing 16 to retain the rear end of the nose within the channel 30.

Mating nose 28 has an opening 28c in the distal end of the nose. A backing block 32 is pivotally mounted by pivot trunions 32a press-fit within notches 34 in the end of the nose. Therefore, the backing block can pivot to accommodate varying angles of the ends of the ferrules of fiber optic connectors, as will be understood hereinafter.

Figure 4:
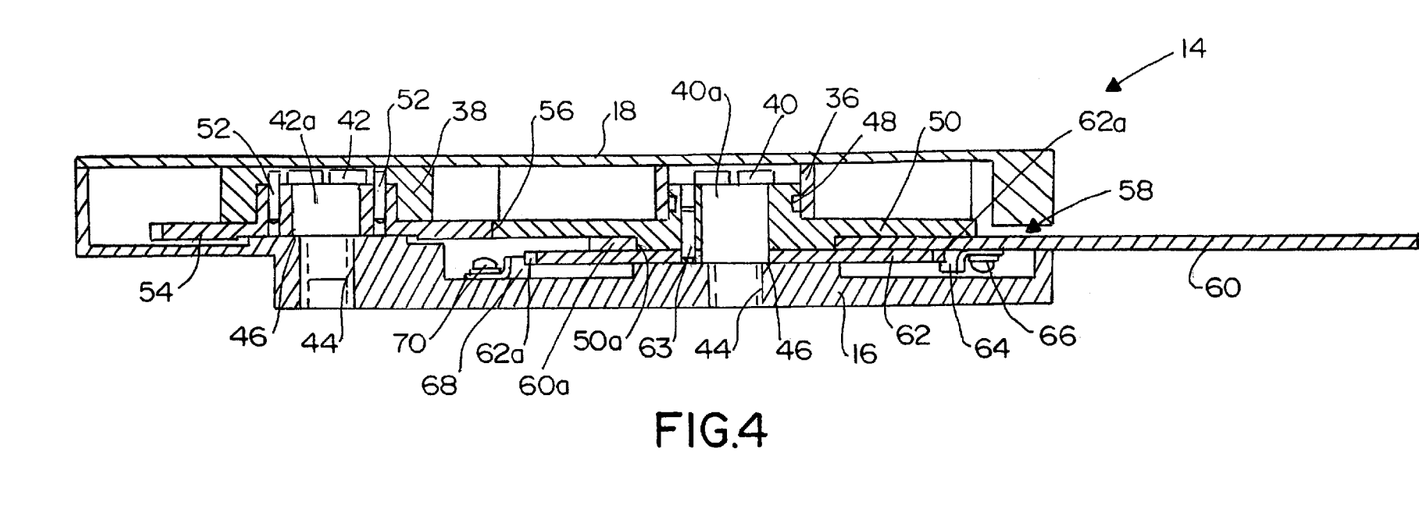
FIG. 4 is a vertical section taken generally along line 4—4 of FIG. 1.

A supply reel 36 and a take-up reel 38 are mounted within interior cavity 20 of housing 16 by a pair of bolts 40 and 42, respectively, which are threaded into the base of housing 16, as at 44 in FIG. 4. The bolts are shanked, as at 46 (FIG. 4), to form shaft portions 40a and 42a about which the reels are free to rotate. Actually, as best seen in FIG. 4, supply reel 36 is fixed by a lock washer 48 to a gear 50, and take-up reel 38 is fixed by a pair of pins 52 to a second gear 54. The gears are in mesh, as at 56. Therefore, the supply reel and the take-up reel are coupled by the gears for conjoint rotation and for free rotation about shaft portions 40a and 42a of bolts 40 and 42, respectively.

Figure 5:
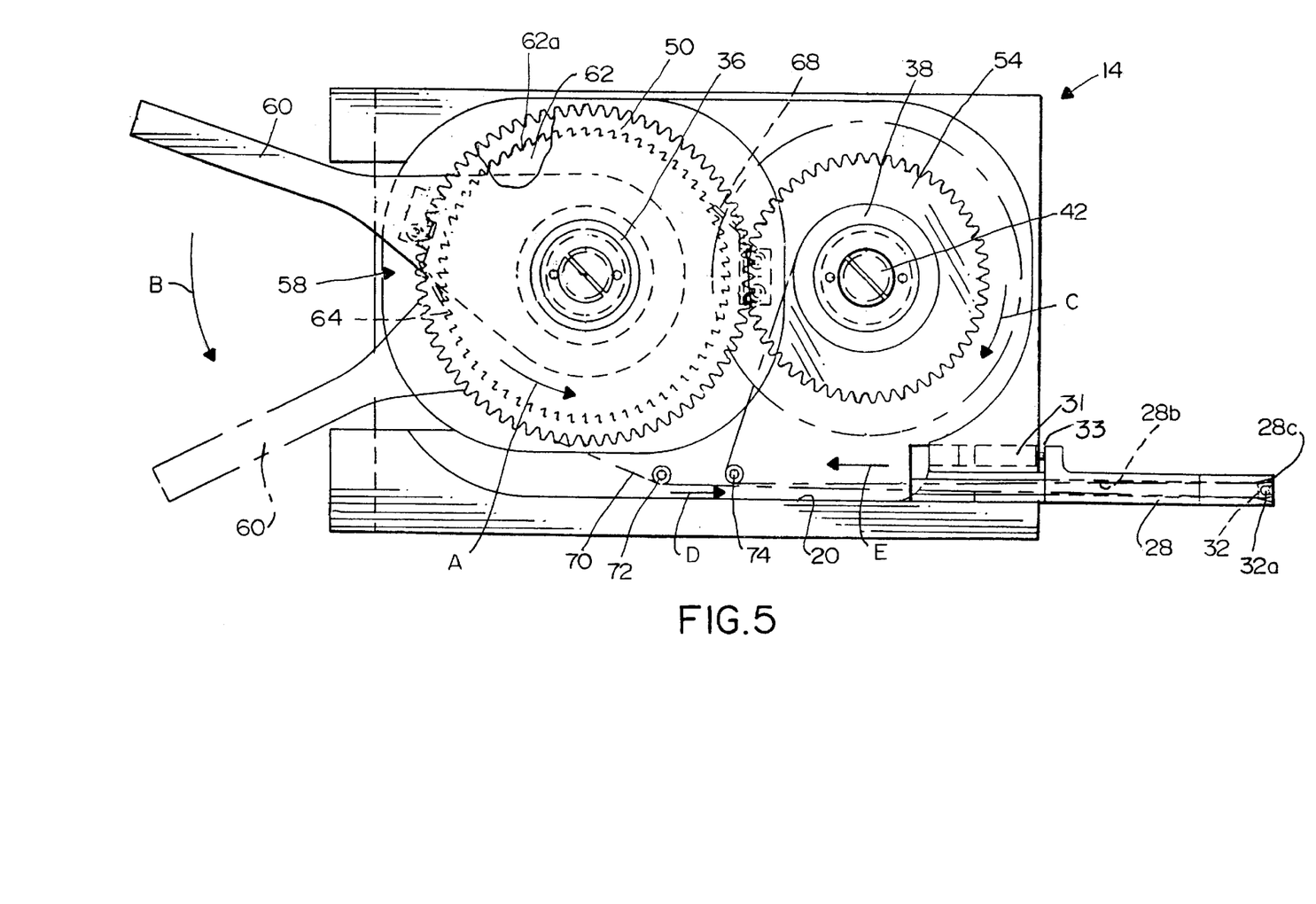
FIG. 5 is a top plan view of the cleaner, with the cleaning tape shown in phantom.

Generally, an advancing mechanism is provided for advancing a cleaning medium, such as a cleaning tape, from supply reel 36 over backing block 32 in nose 28 and back onto take-up reel 38. Specifically, the advancing mechanism is a ratchet mechanism, generally designated 58 (FIGS. 2–4). The ratchet mechanism includes a ratcheting handle 60 having an interior end 60a (FIG. 4) journalled for free rotation about a circular boss portion 50a of gear 50. Inner end 60a of ratcheting handle 60 is sandwiched between gear 50 and a toothed ratchet wheel 62. A pin 63 interlocks the gear and the ratchet wheel for conjoint rotation. A moving pawl 64 is fixed to the underside of ratcheting handle 60 by a fastener 66. A stop pawl 68 is fixed to housing 16 in the bottom of the cavity of the housing by a fastener 70. As seen in FIG. 5, moving pawl 64 and stop pawl 68 are angled to engage teeth 62a about the periphery of ratched wheel 62 to effect movement of the ratchet wheel in the direction of arrow "A" (FIG. 5). Specifically, when ratcheting handle 60 is moved from the full-line position to the phantom position shown in FIG. 5, moving pawl 64 will incrementally rotate ratchet wheel 62 in the direction of arrow "A" and stop pawl 68 will prevent reverse rotation of the ratchet wheel.

From the foregoing, it can be understood that incremental movement of ratcheting handle 60 will effect incremental rotation of both supply reel 36 and take-up reel 38. Once the force initiating the movement of the handle is removed, the handle will be returned to its original position by a spring 51. Specifically, ratcheting handle 60 will incrementally rotate ratchet wheel 62 through moving pawl 64. With the ratchet wheel fixed to gear 50 by pin 63 and with gear 50 being fixed to supply reel 36 by lock washer 48, incremental movement of ratcheting handle 60 incrementally rotates the supply reel. Continuing further, with gear 50 in mesh with gear 54 at 56, and with gear 54 fixed to take-up reel 38 by pins 52, incremental movement of ratcheting wheel 62 is effective to incrementally rotate take-up reel 38 in the direction of arrow "C" (FIG. 5).

With the above understanding of the advancing or ratcheting mechanism 58 of cleaner 14, reference is made to FIG. 5 wherein a cleaning tape 70 is shown being fed off of supply reel 36 around a guide roller 72 and into through passage 28b of mating nose 28. The cleaning tape is moved in a path around the front face of backing block 30 so that the cleaning tape is exposed at opening 28c of the mating nose. The cleaning tape then moves back through passage 28b into interior chamber 20 in the direction of arrow "E", around a second guide roller 74 and onto take-up reel 38. Therefore, a section of the cleaning tape will move past opening 28c of mating nose 28, around backing block 32, in response to each ratcheting action of handle 60. The cleaning tape can be fabricated of woven cloth, paper or other fabric or fibrous material appropriate for cleaning the end of a ferrule of a fiber optic connector.

Figure 6:
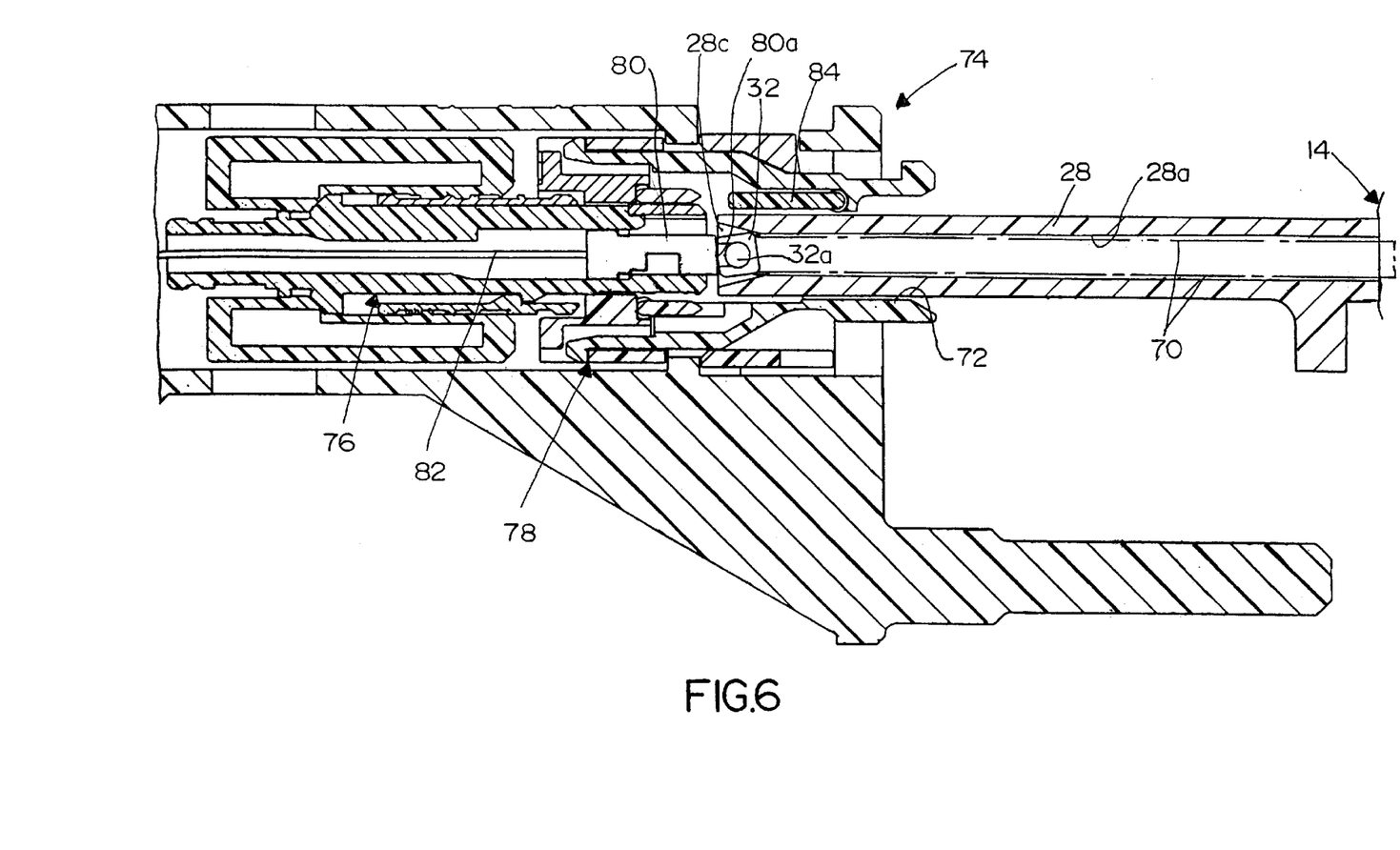
FIG. 6 is a fragmented section through the mating nose of the cleaner inserted into a fiber optic connector assembly.
Figure 7:
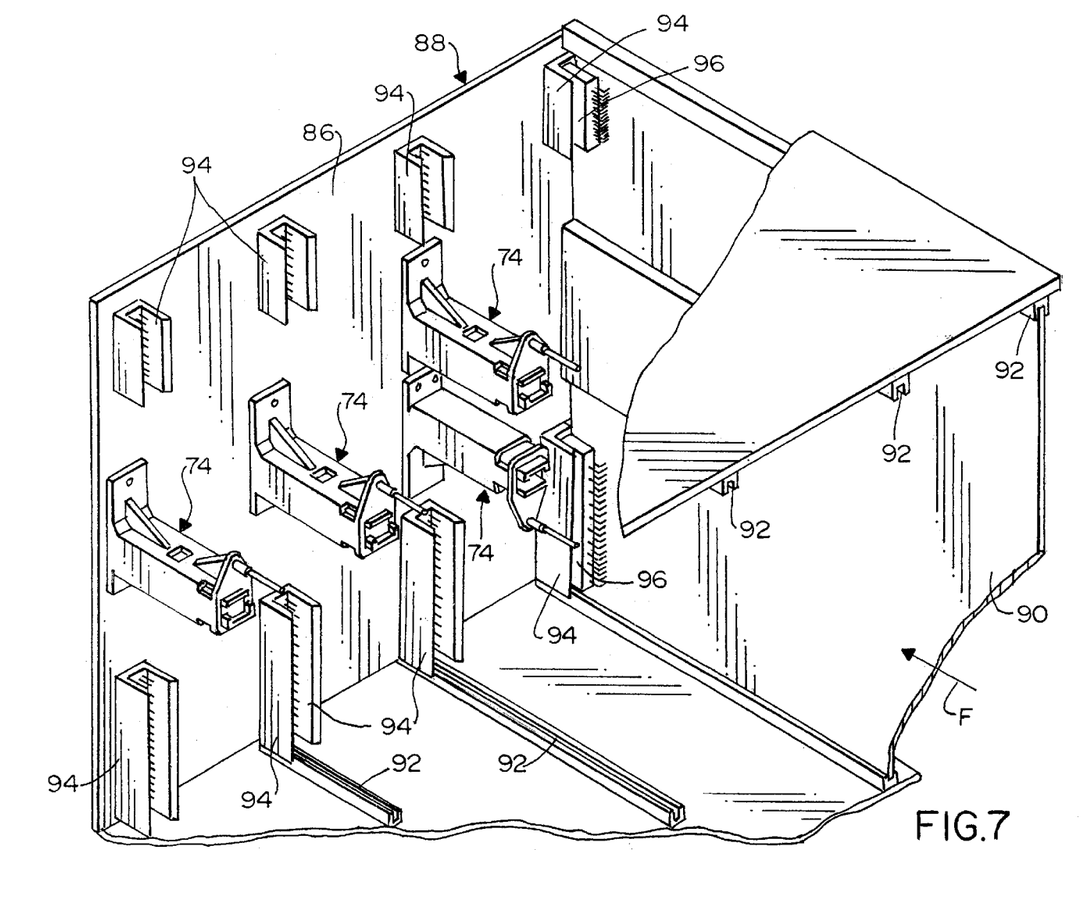
FIG. 7 is a fragmented perspective view of a backplane chassis system within which the cleaner has considerable utility.

FIG. 6 shows how mating nose 28 of cleaner 14 can be mated in a receptacle 72 of an appropriate fiber optic connector assembly, generally designated 74. Actually, the assembly includes a fiber optic connector, generally designated 76, inserted into an adapter, generally designated 78. Connector 76 mounts a ferrule 80 which terminates one or more optical fibers 82. The ferrule has an end face 80a which can be readily cleaned by cleaner 14 of the invention. Mating nose 28 of the cleaner is inserted past a shutter 84 of adapter 78 so that opening 28c and backing block 32 at the distal end of mating nose 28 are juxtaposed in registry with end face 80a of ferrule 80.

It should be understood that connector assembly 74 is but one example of the applicability or utility of cleaner 14. It specifically can be seen that mating nose 28 of the cleaner can access ferrules which are recessed within a fiber optic connector assembly. It also can be understood that by providing mating nose 28 as a separate component from housing 16, the nose can be interchanged with other mating noses of different configurations for different connector assemblies. FIG. 6 also shows the significance of pivotally mounting backing block 32. In many fiber optic connectors, the end face 80a of ferrule 80 is maintained at an angle to the axis of optical fiber(s) 82 for mating with a similarly angled ferrule of a complementary mating connector. Pivotally mounted backing block 32 can accommodate varying angles of the ends of the ferrule.

FIGS. 7–13 show a system for cleaning the end of a ferrule of a fiber optic connector mounted on a backplane 86 of a card frame or backplane chassis, generally designated 88, adapted for receiving a plurality of printed circuit boards 90. Card frame or backplane chassis 88 includes a plurality of guide rails 92 for receiving the top and bottom edges of printed circuit boards 90. A plurality of edge-card connectors 94 are mounted on backplane 86 in alignment with guide rails 92. Header connectors 96 are mounted at the leading edges of printed circuit boards 90 for connection within edge card connectors 94. Alternatively, the edge card connectors could be configured to directly engage circuit traces along the leading edges of the printed circuit boards. A plurality of fiber optic connector assemblies 74 (FIG. 6) are mounted at different locations on backplane 86 generally in alignment with guide rails 92 and edge card connectors 94 (i.e., in alignment with the leading edges of printed circuit boards 90). Printed circuit boards 90 have connectors mounted thereon for mating with fiber optic connector assemblies 74. The printed circuit boards are inserted into chassis 88 in the direction of arrow "F".

It should be understood that the card frame or backplane chassis described above in relation to FIG. 7 is but one application within which the cleaning system of the invention is applicable. In other words, backplane 86 is a "motherboard" and printed circuit boards 90 are "daughter boards" in the card frame or chassis of FIG. 7. However, the cleaning system of the invention is equally applicable wherein printed circuit boards are used with connectors simply mounted on panels or frame components other than a motherboard. Therefore, the use of the term "backplane" herein and in the claims hereof is not limited to the backplane being a printed circuit board.

Figure 8:
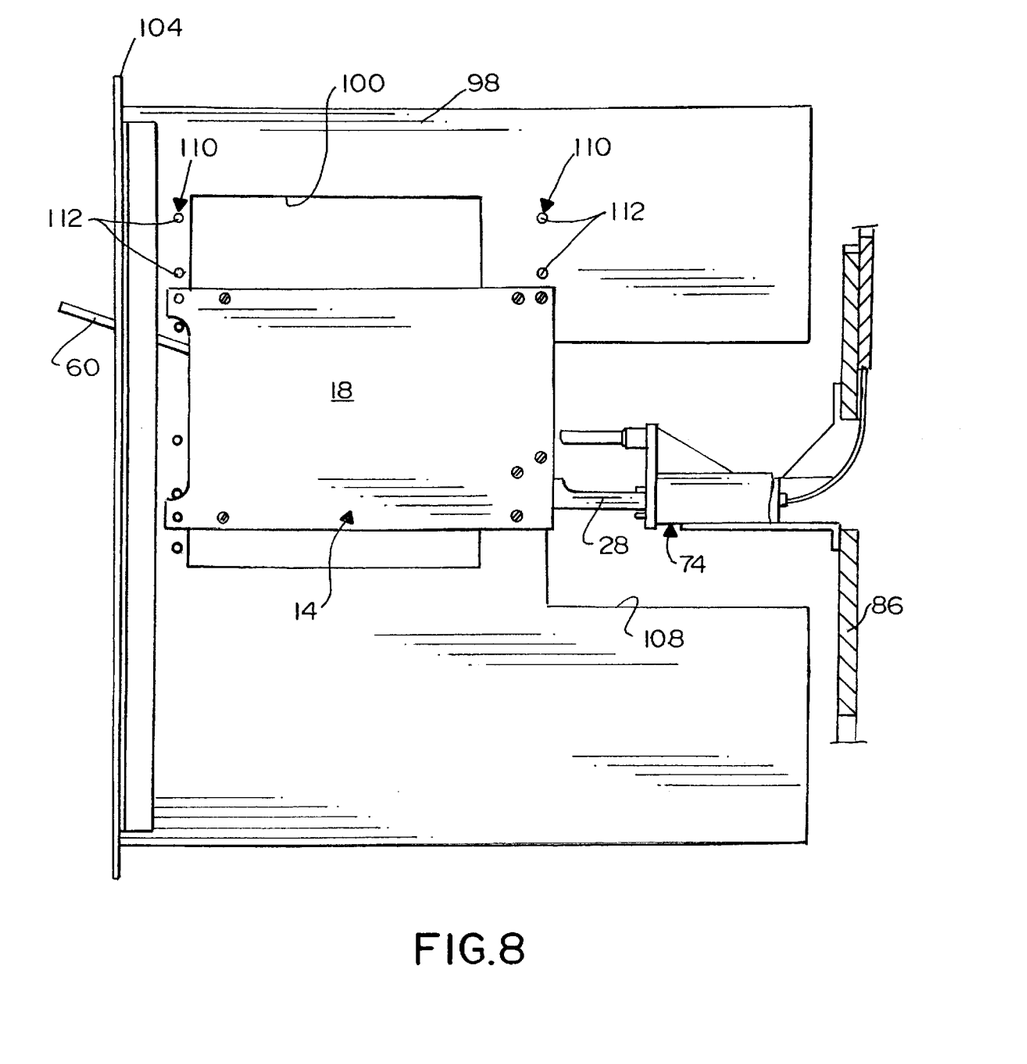
FIG. 8 is a side elevational view of the cleaner mounted on a dummy circuit board, with the mating nose of the cleaner inserted into a connector assembly on the backplane of the chassis of FIG. 7.
Figure 9:
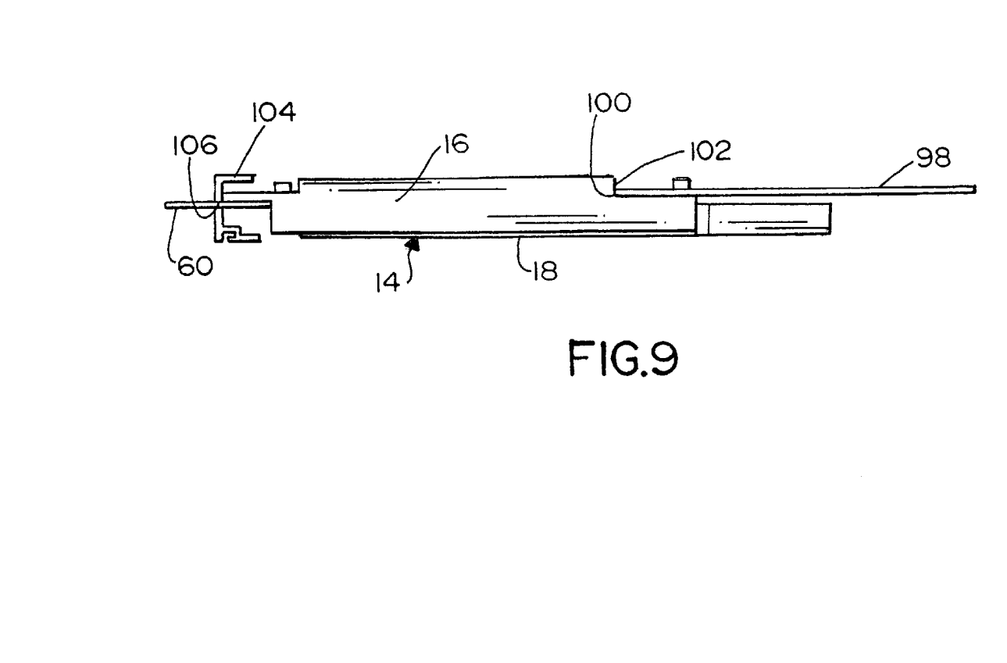
FIG. 9 is a top plan view of the cleaner and dummy circuit board shown in FIG. 8.
Figure 10:
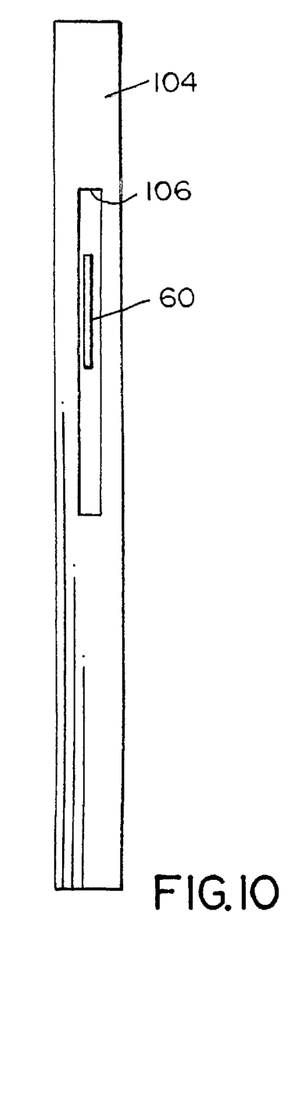
FIG. 10 is a front elevational view of the cleaner and dummy circuit board of FIG. 8.

With that understanding, reference is made to FIGS. 8–10 wherein it can be seen that cleaner 14 (FIGS. 1–6) is mounted on an dummy circuit board 98 having a cut-out portion or opening 100. Referring back to FIG. 1, housing 16 of cleaner 14 has a section 102 of reduced dimensions sized for sliding in cut-out 100 in dummy circuit board 98. A frame piece 104 is mounted to the front of dummy circuit board 98, and the frame piece has an elongated opening 106 through which ratcheting handle 60 of the cleaner projects. FIG. 8 shows one of the fiber optic connector assemblies 74 (FIG. 6) mounted on backplane 86 (FIG. 7) of the card frame or chassis 88. Dummy circuit board 98 has a second cut-out 108 for accommodating connector assembly 74. Mating nose 28 of cleaner 14 projects into cut-out 108 for insertion into connector assembly 74 to clean the ferrule thereof as described above in relation to FIG. 6.

Figure 11:
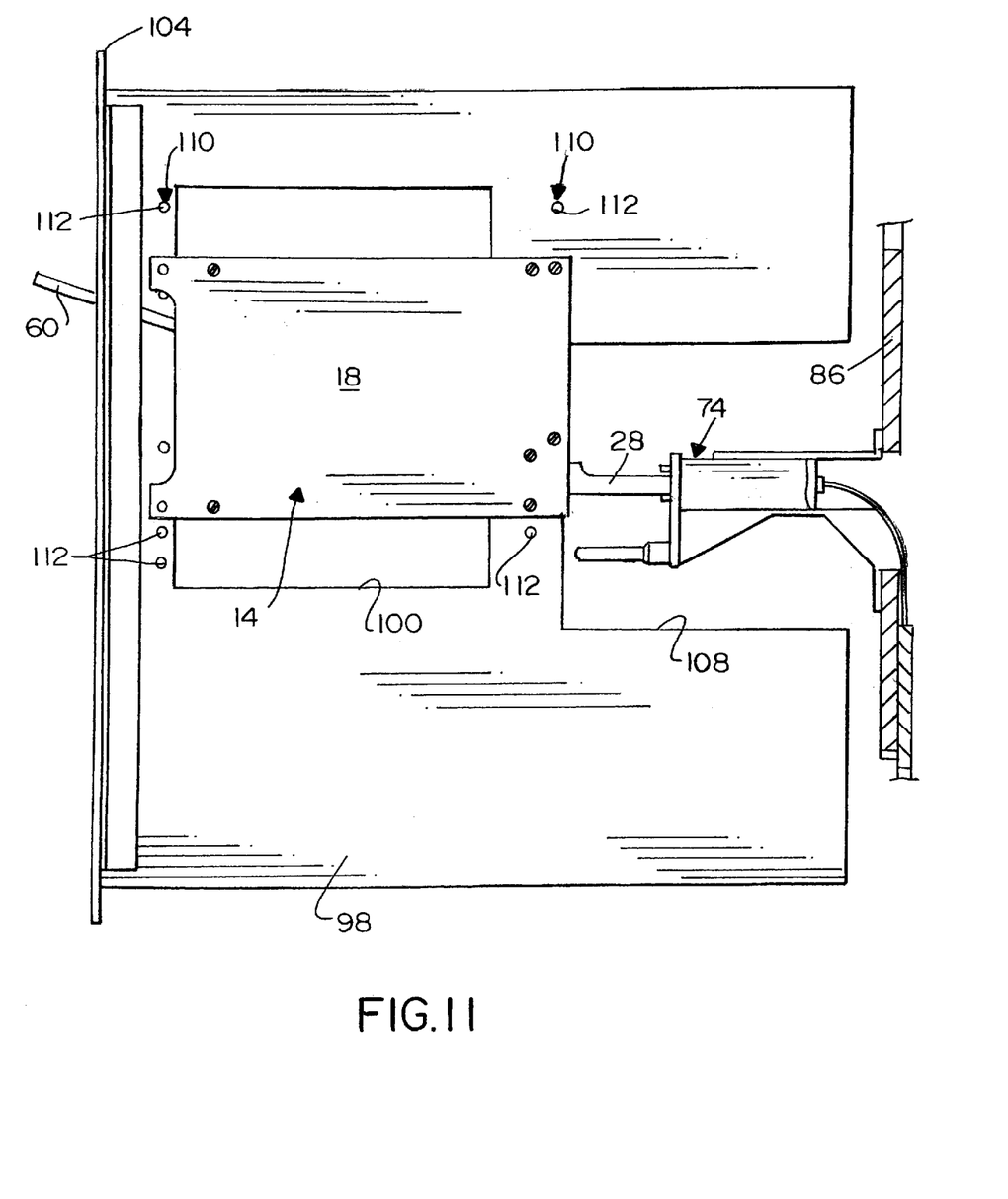
FIGS. 11–13 are views similar to that of FIG. 8, showing the cleaner mounted at different positions on the dummy circuit board for cleaning various fiber optic connector assemblies mounted at different locations on the backplane.
Figure 12:
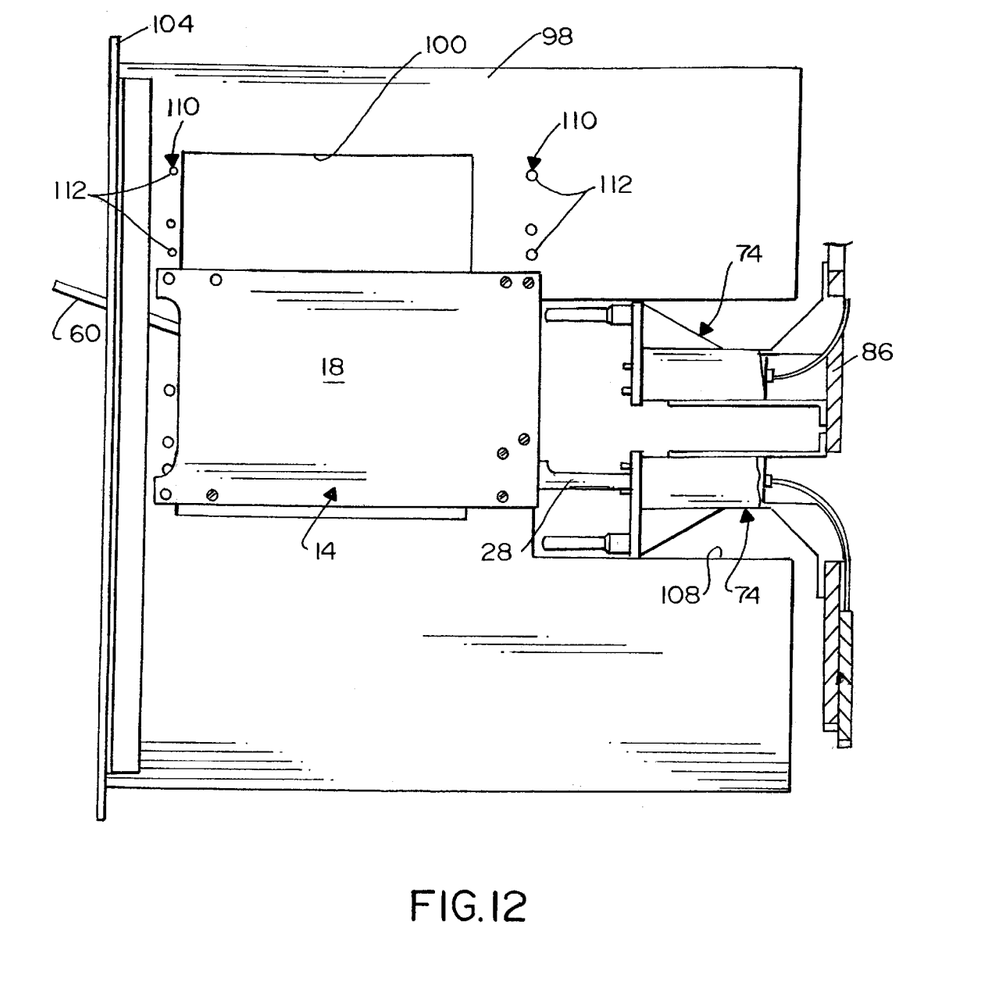
Figure 13:
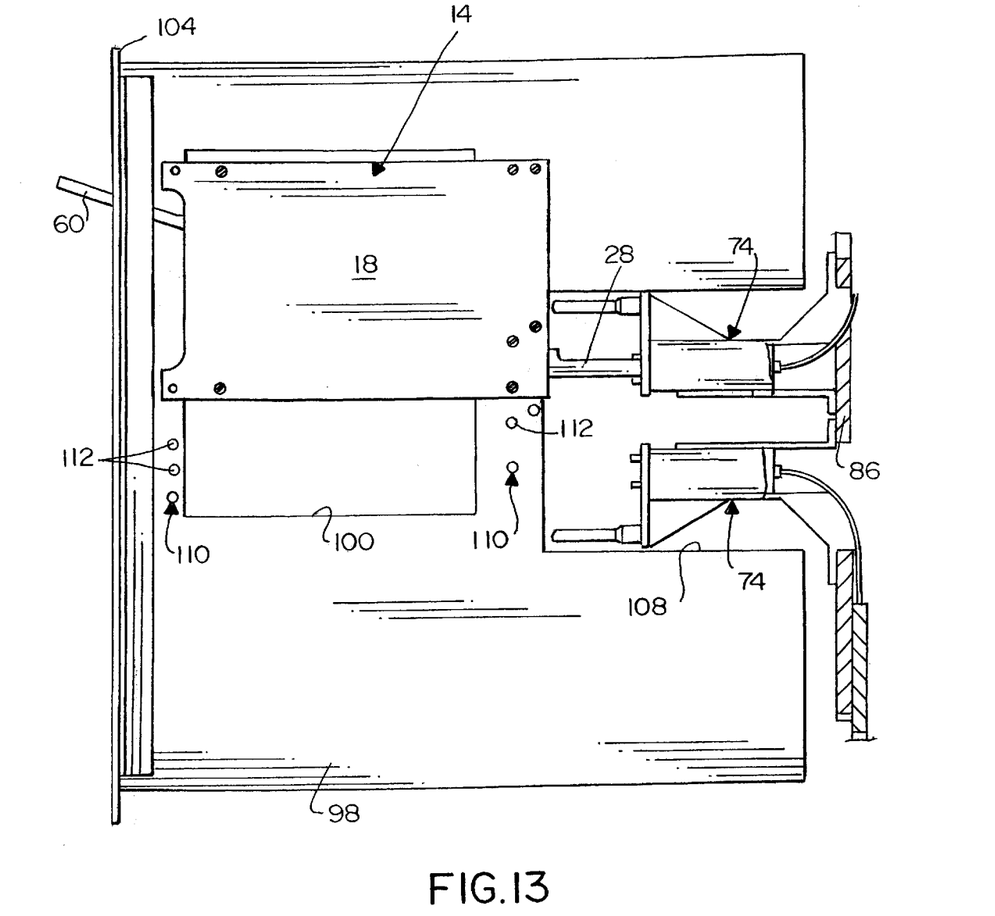

Two rows 110 of mounting holes 112 are formed in dummy circuit board 98 to mount cleaner 14 on the dummy board at different positions to accommodate fiber optic connector assemblies 74 being mounted at different locations on backplane 86. Mounting holes 112 are located for alignment with mounting holes 26 (FIG. 2) in housing 16 of cleaner 14. Therefore, FIG. 8 shows one position for mounting the cleaner on the dummy board to accommodate the location of connector assembly 74 in FIG. 8. FIG. 11 shows cleaner 14 moved upwardly relative to the position of FIG. 8 by using differently positioned mounting holes 112. FIG. 12 shows cleaner 14 moved downwardly from the position of FIG. 8 for accommodating still a differently located fiber optic connector assembly 74. FIG. 13 shows still another position of cleaner 14 on the dummy board at the extreme top range of mounting holes 112 to accommodate a fiber optic connector assembly at still a different location on the backplane. Readily removable fasteners can be used to position in the aligned holes and easily adjust the position of the cleaner on the backplane.

With the system of FIGS. 7–13, it can be understood that an actual printed circuit board 90 can be removed from backplane chassis or card frame 88 (FIG. 7) to expose fiber optic connectors 74 on backplane 86. An operator simply recognizes the location of the fiber optic connector assembly which is to be cleaned and positions cleaner 14 on dummy circuit board 98 accordingly. The dummy circuit board and the cleaner then are inserted into the position where the actual printed circuit board has been removed, and mating nose 28 of the cleaner will be inserted into the receptacle of the fiber optic connector assembly on the backplane. By ratcheting handle 60, cleaning tape 70 will be moved over the ferrule end face of the fiber optic connector assembly to clean the ferrule as described above. After cleaning, the dummy circuit board and the cleaner are pulled out of card frame 88, and the actual printed circuit board can be reinserted and mated with the cleaned connector assembly.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for cleaning the end of a ferrule of a fiber optic connector mounted on a backplane of a chassis adapted for receiving a printed circuit board having a mating connector mateable with the fiber optic connector, comprising:

a dummy circuit board receivable by said chassis;

a cleaner mounted on the dummy circuit board for cleaning the end of the ferrule of the fiber optic connector when the dummy circuit board is received by the chassis; and wherein said cleaner includes a cleaning tape and an advancing mechanism for advancing the cleaning tape past the ferrule end of the fiber optic connector when the dummy circuit board is received by the chassis.

2. The system of claim 1 wherein said dummy circuit board includes a cut-out portion within which at least a portion of the cleaner is mounted.

3. The system of claim 1, including complementary mounting means between the cleaner and the dummy circuit board for mounting the cleaner on the board at different positions to accommodate the fiber optic connector being mounted at different locations on the backplane.

4. The system of claim 3 wherein said complementary mounting means include a plurality of mounting holes in the dummy circuit board for receiving fastening means from the cleaner.

5. The system of claim 1 wherein said cleaner includes a mating portion for mating the cleaner with the fiber optic connector.

6. The system of claim 5 wherein said mating portion of the cleaner comprises a nose for insertion into a mating receptacle of the fiber optic connector.

7. The system of claim 6 wherein said nose includes an opening in a distal end thereof at which the cleaning tape of the cleaner is exposed.

8. The system of claim 1 wherein said cleaner includes a supply reel for supplying said cleaning tape and a take-up reel for taking-up the cleaning tape from the supply reel.

9. The system of claim 8 wherein said cleaner includes a ratcheting mechanism for rotating at least one of said reels to incrementally advance the cleaning tape.

10. The system of claim 9 wherein said cleaner includes a pawl for preventing rotation of at least said one reel.

11. The system of claim 8 wherein said cleaner includes gear means interconnecting the supply reel and the take-up reel for conjoint rotation.

12. A system for cleaning the end of a ferrule of a fiber optic connector, comprising:

a chassis including a backplane;

a fiber optic connector mounted on the backplane and including a ferrule having an exposed end;

means on the chassis for receiving a printed circuit board having a mating connector mateable with the fiber optic connector;

a dummy circuit board receivable by the chassis; and a cleaner mounted on the dummy circuit board for cleaning the end of the ferrule of the fiber optic connector when the dummy circuit board is received by the chassis.

13. The system of claim 12 wherein said dummy circuit board includes a cut-out portion within which at least a portion of the cleaner is mounted.

14. The system of claim 12, including complementary mounting means between the cleaner and the dummy circuit board for mounting the cleaner on the board at different positions to accommodate the fiber optic connector being mounted at different locations on the backplane.

15. The system of claim 14 wherein said complementary mounting means include a plurality of mounting holes in the dummy circuit board for receiving fastening means from the cleaner.

16. The system of claim 12 wherein said cleaner includes a mating portion for mating the cleaner with the fiber optic connector.

17. The system of claim 16 wherein said mating portion of the cleaner comprises a nose for insertion into a mating receptacle of the fiber optic connector.

18. The system of claim 17 wherein said nose includes an opening in a distal end thereof at which a cleaning medium of the cleaner is exposed.

19. The system of claim 12 wherein said cleaner includes a cleaning tape and an advancing mechanism for advancing the cleaning tape past the ferrule end of the fiber optic connector when the dummy circuit board is received by the chassis.

20. The system of claim 19 wherein said cleaner includes a supply reel for supplying said cleaning tape and a take-up reel for taking-up the cleaning tape from the supply reel.

21. The system of claim 20 wherein said cleaner includes a ratcheting mechanism for rotating at least one of said reels to incrementally advance the cleaning tape.

22. The system of claim 21 wherein said cleaner includes a pawl for preventing rotation of at least said one reel.

23. The system of claim 20 wherein said cleaner includes gear means interconnecting the supply reel and the take-up reel for conjoint rotation.

* * * * *